United States Patent [19]

Beatrice

[11] Patent Number: 5,311,029
[45] Date of Patent: May 10, 1994

[54] MAGNETIC SPEED SENSOR WITH OPTICAL CONVERSION

[75] Inventor: Finton J. Beatrice, Vernon, Conn.

[73] Assignee: United Technologies Corporation, Windsor Locks, Conn.

[21] Appl. No.: 878,205

[22] Filed: May 4, 1992

[51] Int. Cl.$^5$ ............................................. G02B 27/00
[52] U.S. Cl. ............................... 250/551; 250/227.21; 250/231.13; 324/174
[58] Field of Search ....................... 250/231.13, 231.14, 250/227.21, 551; 324/173, 174, 175

[56] References Cited

U.S. PATENT DOCUMENTS

| | | | |
|---|---|---|---|
| 4,490,606 | 12/1984 | Lockett et al. | 250/227.21 |
| 4,536,708 | 8/1985 | Schneider | 250/551 |
| 4,539,476 | 9/1985 | Donuma et al. | 250/227.24 |
| 4,595,839 | 6/1986 | Braun et al. | 250/227.24 |
| 4,746,791 | 5/1988 | Forkel | 250/231 |
| 4,922,197 | 5/1990 | Juds et al. | 324/174 |
| 5,032,790 | 7/1991 | Johnson | 324/174 |

*Primary Examiner*—David C. Nelms
*Attorney, Agent, or Firm*—Richard H. Kosakowski

[57] ABSTRACT

An optic speed sensor for sensing the speed of a rotating component such as a gear includes a sensor such as an electromagnetic speed sensor disposed in proximity to teeth of the gear. Within the housing of the sensor are one or more electrical signal lines having electrical signals imposed thereon, the electrical signals being indicative of the rotational speed of the gear. Physically connected to the sensor housing is a mating connector. Disposed within the housing of the mating connector are corresponding one or more LEDs, each LED being electrically connected to the electrical speed signals provided by the sensor. Each LED provides an optical signal indicative of the speed of the gear, each LED having fiber optic cable connected thereto which transmits the optical energy output by the associated LED to an optical receiver disposed away from the sensor, such as a control unit for the device incorporating the gear. The optical receiver transforms the optical signal into a form, such as to an electrical signal, more suitable for the type of signal processing performed at the predetermined location.

5 Claims, 2 Drawing Sheets

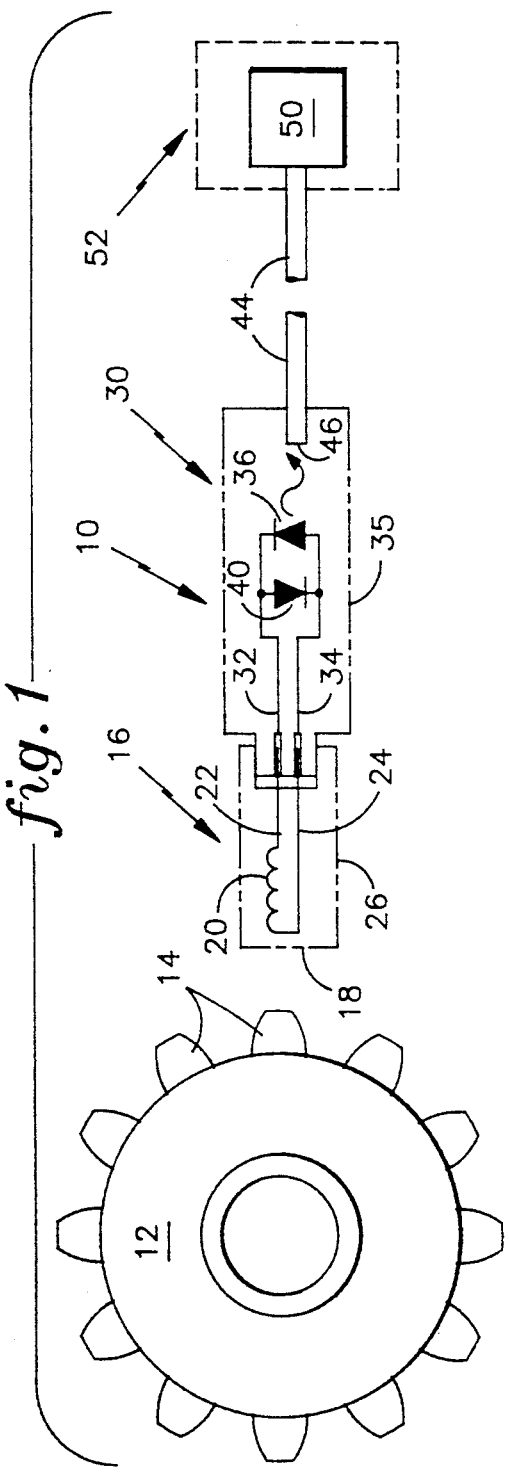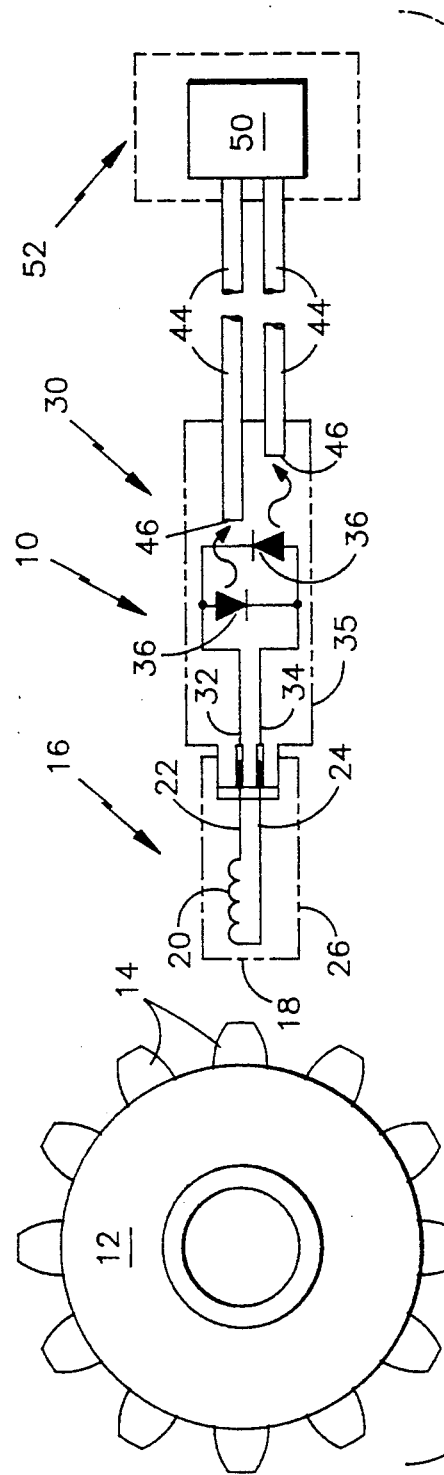

MAGNETIC SPEED SENSOR WITH OPTICAL CONVERSION

TECHNICAL FIELD

The invention relates to optic speed sensors, and more particularly to a simplified optic speed sensor having an optical energy output element connected to the electrical signal output of a speed sensor, typically an electromagnetic speed sensor.

BACKGROUND ART

In the art of speed sensing, it is known to use an electromagnetic sensor to magnetically sense the proximate presence and absence, in relation to the sensor, of, e.g., teeth on a metallic rotating gear. The sensor generates electrical signal pulses that correspond to the presence of gear teeth as they rotate in proximate vicinity to the sensor. The gear is typically an integral component of, e.g., an automotive or aircraft engine having a plurality of rotating components, the rotating speed of said engine being the overall engine parameter desired to be measured.

In a specific example of a speed sensor for a jet aircraft engine, the electromagnetic sensor must operate in a severe environment. The sensor provides electrical signals through signal wires over a distance of several feet or more to an engine control. The engine control processes the electrical signals to derive speed information therefrom.

Due to the severe environment that the aircraft engine and associated sensing and control components reside in, the aforementioned signal wires carrying the speed information are subject to a number of forms of interference. The most common form of electromagnetic interference is due to lightning, high power RADAR signals or other electrical transmitters. Such interference may be detected as false speed information.

It is known to detect the speed of rotation of the shaft using a fiber optic sensor, as exemplified in U.S Pat. No. 4,746,791 to Forkel. This patent describes a number of embodiments of such a sensor. In only one of the embodiments is an optical source, such as a light emitting diode ("LED"), provided in the housing of the sensor. However, in this embodiment, the LED must be supplied with power from an external power supply. Such external power lead wires are a weight penalty and may be subject to the aforementioned interference effects. Further, the remaining embodiments require optical energy to be transmitted from an external source disposed away from the sensor housing. Thus additional components are required, adding undesirable cost, weight and complexity to the sensor.

In addition, for use with fiber optic sensors, the present day optic signal fibers have a major reliability problem in the optical connector associated therewith. Every time the optic connector is disconnected and reconnected, the engine environment poses the jeopardy of significant or total loss of the optic signals due to contamination. Oil fumes, water vapor, dust and grit can readily block or degrade the optic path which, for a 100 micron diameter fiber is about 0.004 inches across.

DISCLOSURE OF INVENTION

Objects of the invention include the provision of a simplified optical speed sensor which allows for transmission of speed information signals over distances in a harsh environment without being subject to forms of electromagnetic interference.

Further objects include the provision of the simplified optical speed sensor which resides in the connector of an electromagnetic speed sensor.

Still further objects include the provision of the simplified optical speed sensor which converts the electrical signals from an electromagnetic speed sensor to optical signals directly at the connector of the electromagnetic sensor, thereby eliminating the need for a separate optic power source and additional optic fiber.

According to the present invention, an optic speed sensor for sensing the speed of a rotating component such as a gear includes a sensor disposed in proximity to teeth of the gear. Within the housing of the sensor are one or more electrical signal lines having electrical signals imposed thereon, the electrical signals being indicative of the rotational speed of the gear. Physically connected to the sensor housing is a mating connector. Disposed within the mating connector housing are corresponding one or more light emitting diodes ("LEDs"), each LED being electrically connected to the electrical speed signals provided by the sensor. Each LED provides an optical signal indicative of the speed of the gear.

According further to the invention, each LED has a predetermined length of fiber optic cable connected thereto. The fiber optic cable transmits the optical energy output by the associated LED to an optical receiver disposed away from the sensor, such as a control unit for the device incorporating the gear, the control unit typically comprising the engine control. The optical receiver transforms the optical signal into a form, such as to an electrical signal, more suitable for the type of signal processing performed at the predetermined location.

The present invention has utility in speed sensing applications in harsh or severe temperature and weather environments. Such applications include jet aircraft engines. In such an environment, the simplified optic speed sensor according to the present invention provides optical signals indicative of the rotational speed of the rotor of the jet engine or other rotating component therein. The optical signals are provided over fiber optic cable to a signal processor for subsequent informational processing. Signals provided over such fiber optic cable are relatively immune from external sources of interference, such as electromagnetic radiation. Thus, the signals provided are of higher integrity than those provided over prior art electrical conductors.

Further, by powering the LED directly by the electrical speed signals generated by the, e.g., electromagnetic speed sensor, the present invention eliminates the need for a separate power source for the LED or other light source along with the fiber to conduct that light to the speed sensor. The manner of use of the LED in the present invention allows such LED to operate at only approximately seven percent (7%) of rated current, thereby increasing the life and reliability thereof. The present invention also eliminates the need for additional optic fibers to transport optical energy to the sensor housing, as taught by the aforementioned U.S. Pat. No. 4,746,791 to Forkel.

These and other objects, features and advantages of the present invention will become more apparent in light of the detailed description of a best mode embodiment thereof, as illustrated in the accompanying drawings.

BRIEF DESCRIPTION OF DRAWINGS

FIG. 1 is a block diagram illustration of the optic speed sensor of the present invention as used in an exemplary speed sensing embodiment;

FIG. 3 is a block diagram illustration of the optic speed sensor of FIG. 1 as used in an alternative exemplary speed sensing embodiment.

BEST MODE FOR CARRYING OUT THE INVENTION

Figure 2:
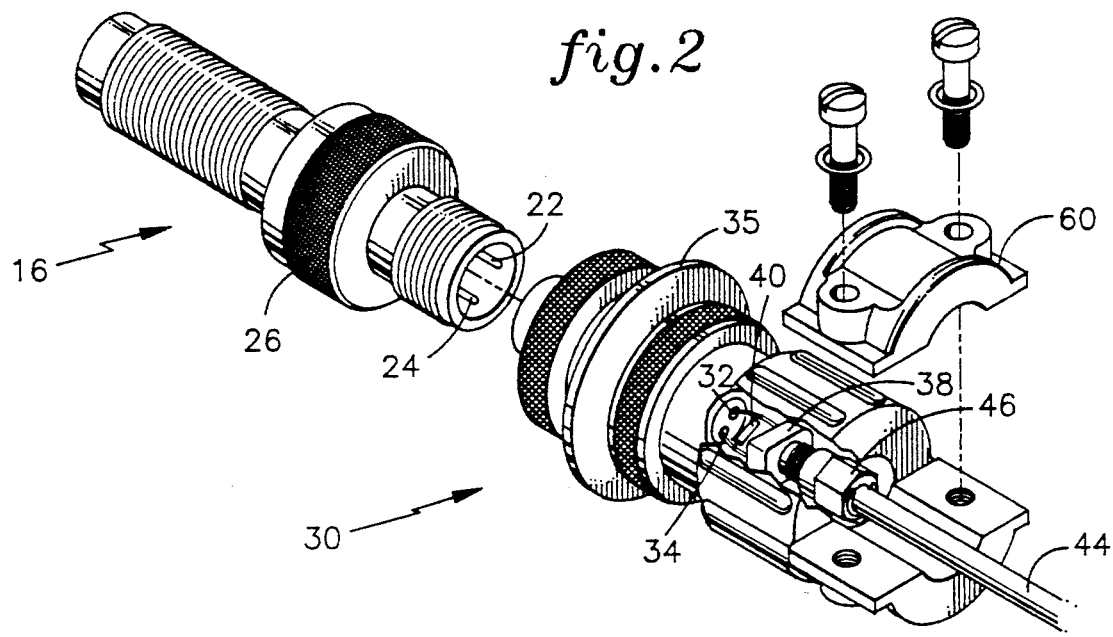
FIG. 2 is a cross sectional perspective view, partially cut away, of the optic speed sensor of FIG. 1 partially disassembled.

Referring to FIG. 1, there illustrated is a block diagram of an exemplary speed sensing embodiment incorporating the optic speed sensor 10 of the present invention. A gear 12 having a plurality of metallic teeth 14 rotates in a predetermined direction. The gear 12 may be an integral part of, e.g., an aircraft or automotive engine. The rotational speed of the gear is the parameter desired to be sensed by the optic speed sensor 10 of the present invention.

A commercially available electromagnetic speed sensor 16 has a facing surface 18 which is disposed at a predetermined desired distance from the rotational path of the gear teeth 14. The electromagnetic speed sensor 16 may comprise, without limitation, the Model 3040 HTBA provided by Electro Corp. An exemplary air gap between the sensor's magnetic pole face on the facing surface 18 and the gear teeth is approximately 0.030 inches. The sensor 16 magnetically senses the proximate presence and absence of the teeth as they rotate past the facing surface of the sensor. A coil 20 in the sensor converts the magnetic pulses to time-varying AC ("Alternating Current") electrical signals, and provides these electrical signals on a pair of signal lines 22,24. The coil 20 is housed in a rugged housing 26, as seen in more detail with respect to FIG. 2.

Physically connected to the sensor housing 26 is a commercially available mating connector 30, such as the Model AN-3057-4, provided by Amphenol, which is also illustrated in more detail in FIG. 2. The electrical signal lines 22,24 in the electromagnetic speed sensor 16 are connected to corresponding electrical signal lines 32,34 inside a housing 35 of the mating connector 30. According to the present invention, physically disposed inside the mating connector housing 35 is a source of optical energy, preferably a light emitting diode ("LED") 36. The LED 36 is electrically connected to the electrical signal lines 32,34 of the mating connector and converts the AC electrical signals to corresponding optical energy pulses. The electrical signal lines 32,34 may comprise the wire leads emanating from the LED itself. The LED may typically comprise, e.g., the commercially available Model HFE4000, provided by Honeywell. The LED is mounted in a commercially available holder 38 (see FIG. 2), e.g., the Model HFE4807, also provided by Honeywell. The LED may be a high radiance gallium aluminum arsenide ("GaAlAs") infrared ("IR") LED which provides optical energy at a wavelength of 850 nanometers ("nm").

Connected across the two electrical signal lines 32,34 in the mating connector is a diode 40. The diode 40 suppresses undesirable electrical voltage and current surges which may occur in the electrical signal lines 32,34. The diode limits the reverse voltage applied to the LED to about one (1.0) volt. The LED reverse voltage rating is typically about seven (7.0) volts. The diode may be, e.g., the commercially available Model 1N1550.

Figure 2A:
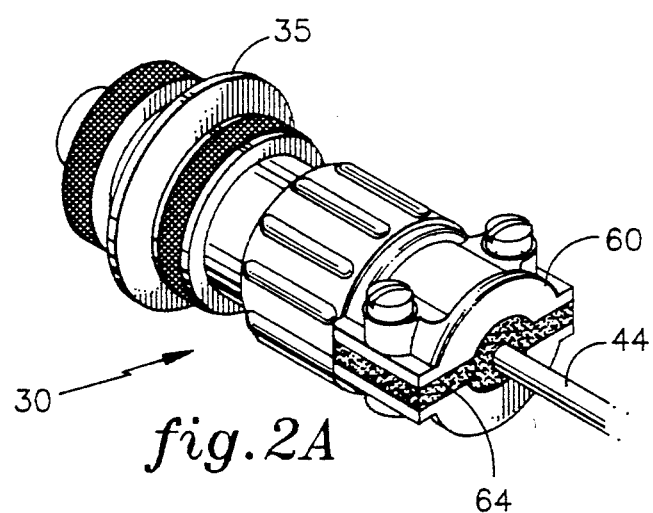
FIG. 2A is a perspective illustration of the optic speed sensor of FIG. 1 in a fully assembled form.

Connected to the LED holder 38 is one end of a length of commercially available fiber optic cable 44. The cable 44 may comprise a multi-mode fiber, typically 200 microns in diameter, provided by Ensign-Bickford, Simsbury, Conn. Mounted at each end of the fiber optic cable is an industry standard, commercially available SMA connector 46. Such connector 46 screws into the LED holder 38 inside the mating connector. As a result, optical energy from the LED 36 is transferred relatively loss-free into the fiber optic cable. As illustrated in FIG. 1, the SMA connector screwed to the LED holder is disposed within the mating connector housing 35. The mating connector is filled with a potting compound 64 (see FIG. 2A) which seals the LED/fiber interface from ambient contamination and which is described in more detail hereinafter with respect to FIG. 2A.

The other end of the fiber optic cable 44 is connected to an optic receiver 50, disposed within a control unit 52 for the device whose speed is being measured. For example, the control unit 52 may be an aircraft propulsion control if the optic speed sensor 10 of the present invention is sensing the speed of rotation of an aircraft jet engine. The control unit is located at some distance from the speed sensor 10. Thus, speed information as sensed by the optic speed sensor is passed over the fiber optic cable to the control unit.

The optical receiver 50 may comprise the commercially available Model HFD3882-2, Schmitt-Trigger receiver, provided by Honeywell Optoelectronics, Richardson, Tex. The receiver's TO-18 can has an optical window to receive input light pulses from the optic fiber. The receiver is hermetically sealed and provides one or more electrical output signals indicative of the speed of the gear, such signals being provided to other signal processing circuitry (not shown) disposed within the control unit. It is to be understood that such additional signal processing circuitry forms no part of the present invention.

Referring to FIG. 2, there illustrated in perspective view is the electromagnetic speed sensor 16, including the two electrical signal lines 22,24 over which speed information is imposed. The signal lines comprise metallic pins. Also illustrated in FIG. 2 in perspective view, partially cut away, and in partially disassembled form, is the mating connector 30. The connector 30 is illustrated as being detached from the electromagnetic sensor 16. Although not shown, the metallic pins 22,24 physically connect to corresponding metallic female receptacles located at the front of the mating housing and disposed therewithin (when the mating connector mates with the electromagnetic sensor). The female receptacles comprise the electrical signal lines 32,34 within the mating connector housing 35, are contiguous through a portion of the mating connector housing, and are visible at the cut away portion of FIG. 2.

The wire leads emanating from the LED 36 (not visible) inserted within the LED holder 38 are solder connected to the female receptacles so as to form electrical connections thereto. The LED holder is disposed within a spatial void inside the mating connector housing. The LED directs optical energy towards the rear of the mating connector housing. Solder connected across the pair of LED wire leads is the diode 40. The SMA connector 46 at one end of the fiber optic cable 44 is illustrated as being screw connected to the LED holder. The SMA connector 46 is disposed within the spatial void inside the housing of the mating connector. Thus, the LED directs optical energy down the fiber optic cable. A portion of the strain relief 60 for the mating connector housing 35 is illustrated as being disassembled from the remainder of the housing.

Although not visible in FIG. 2, after the aforementioned components are assembled within the mating connector housing, the remainder of the spatial void therewithin is filled with a commercially available potting compound 64, such as an epoxy. This is better illustrated in FIG. 2A, which illustrates the mating connector 30 fully assembled. The potting compound 64 seals out any contamination which may disturb the integrity of the components and connections therein.

In the alternative embodiment of FIG. 3, two LEDs 36 and corresponding lengths of fiber optic cables 44 are utilized, while the diode 40 across the pair of LED wire leads 32,34 may be omitted. Otherwise, FIG. 3 is similar in all respects to the embodiment of FIG. 1 and FIGS. 2 and 2A. The LEDs 36 are connected in parallel (anode to cathode). Each LED converts half of the AC electrical signal provided by the electromagnetic speed sensor into optic energy pulses. The optical energy is then transmitted down the corresponding fiber optic cable 44 to appropriate optical receivers 50 located at the control unit 52.

The present invention has all of the rugged characteristics of the commercially available electromagnetic speed sensor. The installation is identical to presently used engine speed sensors, differing only in cable connector which would house one or more LEDs and bring out the optic fibers.

Further, the optic speed sensor of the present invention operates with low LED drive current and power dissipation levels (about seven percent (7%) of rated), thus increasing LED device reliability and mean time between failure greatly. The constant current nature of the LED drive current, along with the relatively low (7%) power dissipation level of the LED, are derived with reference to FIG. 4 and the following equations.

Figure 4:
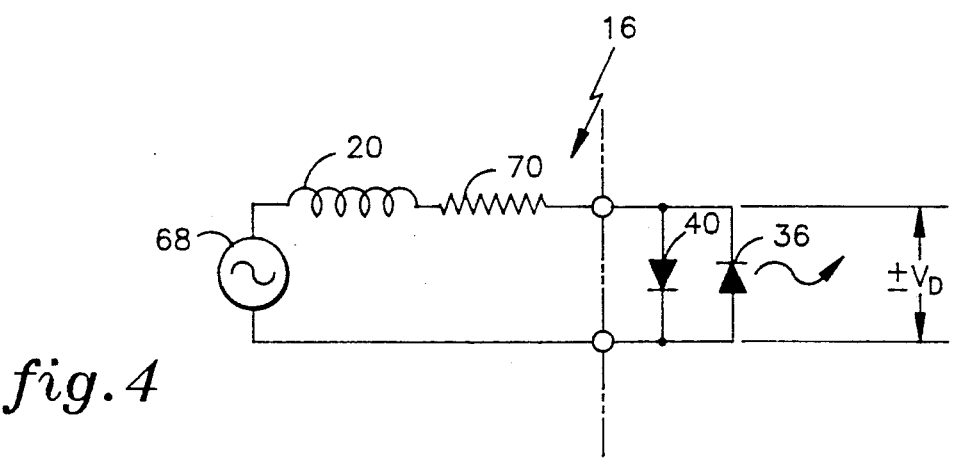
FIG. 4 is a schematic diagram of an equivalent electrical circuit of an electromagnetic sensor as used in exemplary speed sensing embodiment of FIG. 1.

Illustrated in FIG. 4 is a schematic diagram of an equivalent circuit of the electromagnetic speed sensor 16 connected to the diode 40 and LED 36. The equivalent circuit of the sensor 16 comprises a generator 68 ($E_g$), which produces an approximate sinusoidal vol signal having a magnitude proportional to the rotational speed of the gear teeth. Also illustrated is the coil 20 along with its corresponding resistance 70 in series therewith. For a gear having sixty (60) teeth:

$$E_g = K^* w^* \sin(60^* w^* t) \quad \text{(Eq. 1)}$$

where:
 w equals the angular velocity of the gear;
 t equals time in seconds; and
 K equals 0.09 volt/rad/sec.

The generator 68 produces a sinusoidal electrical current, i, limited by the resistance, R, 70 and the inductive reactance of the coil, L, 20. The sinusoidal current is given by:

$$i = (E_g - V_D)/(R + j(60^* w)^* L) \quad \text{(Eq. 2)}$$

The peak value of the sinusoidal current is given by:

$$\begin{aligned} i_{peak} &= (K^* w - V_D)/[R^2 + (60^* w^* L)^2]^{\frac{1}{2}} \\ &= (K^* w - V_D)/(L^*[(R/L)^2 + (60^* w)^2]^{\frac{1}{2}}) \end{aligned} \quad \text{(Eq. 3)}$$

The magnitude of the generator output gives the maximum current to the LED. Thus, $K^*w >> V_D$, and $60^*w^*L >> R$. Therefore:

$$|i_{peak}| = (K^*w)/(L^*60^*w) = K/(60^*L) \quad \text{(Eq. 4)}$$

For the aforementioned Model 3040 HTBA electromagnetic speed sensor 16 provided by Electro Corp., L=0.07 Henry and R=150 ohms. Substituting these values into Eq. 4 yields:

$$i_{peak} = 0.09/(60^*0.07) = 0.021 \text{ Amperes}$$

The RMS value of the current equals:

$$\begin{aligned} i_{RMS} &= 0.707^*(i_{peak})/2 \\ &= 0.707^*(0.021)/2 = 0.0074 \text{ Amperes} = 7.4 \text{ mA} \end{aligned} \quad \text{(Eq. 5)}$$

For a typical LED current rating of 100 mA, the LED thus operates at 7.4% of rated current.

The present invention has been described for use with an electromagnetic speed sensor. It is to be understood, however, that any type of speed sensor which provides speed information in the form of electrical signals may be utilized, without limitation. Further other types of connectors, LEDs, LED holders, diodes, fiber optic cables, and optic receivers may be used without departing from the broadest scope of the present invention in light of the teachings herein.

All of the foregoing changes and variations are irrelevant; it suffices for the broadest scope of the present invention that an optic speed sensor for sensing the speed of a rotating component such as a gear includes a speed sensor disposed in proximity to teeth of the gear; within the housing of the sensor are one or more electrical signal lines having electrical signals imposed thereon, the electrical signals being indicative of the rotational speed of the gear; physically connected to the sensor housing is a commercially available mating connector, disposed within the housing of the mating connector are corresponding one or more LEDs, each LED being electrically connected to the electrical speed signals provided by the sensor, each LED providing an optical signal indicative of the speed of the gear, each LED having a predetermined length of fiber optic cable connected thereto, the fiber optic cable transmitting the optical energy output by the associated LED to an optical receiver disposed away from the sensor, such as a control unit for the device incorporating the gear, the optical receiver transforms the optical signal into a form, such as to an electrical signal, more suitable for the type of signal processing performed at the predetermined location.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

I claim:

1. A sensor for sensing the speed or rotation of a shaft, comprising:

magnetic speed sensing means for magnetically sensing the speed of rotation of the shaft, and for providing an electrical signal indicative thereof, the magnetic speed sensing means being disposed in close physical proximity to the shaft;

first housing means, having one or more electrical connectors at an output thereof, for housing the magnetic speed sensing means, the electrical signal being in electrical connection with the corresponding one or more electrical connectors;

dual-element optical conversion means, disposed in proximity to the magnetic speed sensing means, for converting the electrical signal indicative of the speed of rotation of the shaft into corresponding optical signals; and second housing means, having one or more electrical connectors at an input thereof, the second housing means electrical connectors being in electrical connection with the electrical signal, and having one or more optical connectors at an output thereof, the second housing means comprising means for housing the optical conversion means, the second housing means being in releasable mechanical connection with the first housing means.

2. The sensor of claim 1, further comprising optical fiber means, having a first end disposed in releasable mechanical connection with the corresponding one or more optical connectors at the output of the second housing means such that the optical signals are coupled into the first end of the optical fiber means, for propagating the optical signals along a predetermined length of the optical fiber means.

3. The sensor of claim 2, further comprising optical receiver means, physically coupled to a second end of the optical fiber means, for converting the optical signals to a corresponding electrical signal indicative of the speed of rotation of the shaft.

4. The sensor of claim 1, further comprising potting means, disposed throughout any spatial voids in the second housing means, for environmentally sealing the second housing means, thereby protecting the optical conversion means from the environment.

5. The sensor of claim 1, wherein the dual-element optical conversion means comprises light emitting diodes.

* * * * *